United States Patent
Vo et al.

(10) Patent No.: US 11,225,598 B2
(45) Date of Patent: Jan. 18, 2022

(54) TREATMENT FLUIDS CONTAINING DEGRADABLE FIBERS GRAFTED WITH A CROSSLINKER

(71) Applicant: HALLIBURTON ENERGY SERVICES, INC., Houston, TX (US)

(72) Inventors: Loan K. Vo, Houston, TX (US); Philip D. Nguyen, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/959,062

(22) PCT Filed: Jan. 29, 2018

(86) PCT No.: PCT/US2018/015737
§ 371 (c)(1),
(2) Date: Jun. 29, 2020

(87) PCT Pub. No.: WO2019/147283
PCT Pub. Date: Aug. 1, 2019

(65) Prior Publication Data
US 2020/0339869 A1    Oct. 29, 2020

(51) Int. Cl.
| | |
|---|---|
| C09K 8/512 | (2006.01) |
| C09K 8/514 | (2006.01) |
| E21B 43/04 | (2006.01) |
| E21B 43/267 | (2006.01) |
| C09K 8/68 | (2006.01) |

(Continued)

(52) U.S. Cl.
CPC .............. *C09K 8/685* (2013.01); *C09K 8/512* (2013.01); *C09K 8/514* (2013.01); *C09K 8/5756* (2013.01); *C09K 8/5758* (2013.01); *C09K 8/80* (2013.01); *E21B 43/04* (2013.01); *E21B 43/267* (2013.01); *C09K 2208/08* (2013.01)

(58) Field of Classification Search
None
See application file for complete search history.

(56) References Cited

U.S. PATENT DOCUMENTS

| | | |
|---|---|---|
| 5,330,005 A | 7/1994 | Card et al. |
| 5,501,274 A | 3/1996 | Nguyen et al. |
| 6,599,863 B1 | 7/2003 | Palmer et al. |

(Continued)

FOREIGN PATENT DOCUMENTS

CN    102086592 A    6/2011

OTHER PUBLICATIONS

English abstract of CN102086592; retrieved from www.epacenet.com on Jan. 29, 2018.

(Continued)

*Primary Examiner* — Charles R Nold
(74) *Attorney, Agent, or Firm* — Polsinelli PC (57) ABSTRACT

Treatment fluid compositions that include a carrier fluid, a crosslinkable polymer, one or more degradable fibers grafted with a crosslinking moiety capable of crosslinking the crosslinkable polymer, and optionally a proppant or gravel. Methods and systems for treating a subterranean wellbore or formation using the grafted degradable fiber treatment fluids are further provided. The presently disclosed treatment fluids may be suitable for use as hydraulic fracturing treatment fluids, gravel packing treatment fluids, or fluid diversion treatment fluids.

20 Claims, 6 Drawing Sheets

(51) Int. Cl.
*C09K 8/575* (2006.01)
*C09K 8/80* (2006.01)

(56) References Cited

U.S. PATENT DOCUMENTS

| | | | |
|---|---|---|---|
| 6,837,309 B2 | 1/2005 | Boney et al. | |
| 7,565,929 B2 | 7/2009 | Bustos et al. | |
| 7,833,950 B2 | 11/2010 | Willberg et al. | |
| 8,042,614 B2 | 10/2011 | Sullivan et al. | |
| 8,299,148 B2 | 10/2012 | Ikegame et al. | |
| 8,479,617 B2 | 7/2013 | Shindgikar et al. | |
| 9,790,777 B2 | 10/2017 | Nguyen et al. | |
| 2006/0157248 A1* | 7/2006 | Hoefer | C09K 8/68 166/300 |
| 2008/0119374 A1* | 5/2008 | Willberg | C09K 8/76 507/209 |
| 2009/0023614 A1 | 1/2009 | Sullivan et al. | |
| 2009/0120639 A1* | 5/2009 | Nguyen | C09K 8/72 166/275 |
| 2013/0105157 A1* | 5/2013 | Barmatov | E21B 43/267 166/280.1 |
| 2013/0233553 A1 | 9/2013 | Rohden | |
| 2013/0310491 A1 | 11/2013 | Crandall et al. | |
| 2016/0053599 A1 | 2/2016 | Nguyen et al. | |
| 2016/0102244 A1 | 4/2016 | Takahashi et al. | |
| 2016/0122618 A1* | 5/2016 | Nguyen | C09K 8/03 166/307 |
| 2017/0022671 A1 | 1/2017 | Brogan et al. | |
| 2017/0174980 A1 | 6/2017 | Ladva et al. | |
| 2017/0198208 A1 | 7/2017 | Lu et al. | |

OTHER PUBLICATIONS

International Search Report and Written Opinion; PCT Application No. PCT/US2018/015737; dated Oct. 29, 2018.

* cited by examiner

TREATMENT FLUIDS CONTAINING DEGRADABLE FIBERS GRAFTED WITH A CROSSLINKER

CROSS-REFERENCE TO RELATED APPLICATIONS

This application is a national stage entry of PCT/US2018/015737 filed Jan. 29, 2018, said application is expressly incorporated herein by reference in its entirety.

FIELD

The present disclosure relates to treatment fluids in subterranean wellbores. In particular, the present disclosure relates to fluids used to treat subterranean wellbores and geological formations contained therein that may be used during hydraulic fracturing, gravel packing, and fluid diversion operations.

BACKGROUND

Wellbores are drilled into the earth for a variety of purposes including tapping into hydrocarbon bearing formations to extract the hydrocarbons for use as fuel, lubricants, chemical production, and other purposes. During wellbore operations it is common to introduce a treatment fluid into the well. Treatment fluids may be used to produce or resolve a specific condition of a subterranean well or subterranean geological formation. Treatment fluids may include, for example, fluids used to facilitate stimulation, isolation, gravel packing, or fluid diversion operations in a wellbore. For example, a treatment fluid may be used to flow and deposit gravel in the annulus between a downhole screen and the wellbore to form a "gravel pack." The screen is designed to prevent the gravel in the treatment fluid from flowing through it and entering the production tubing. The gravel pack of tightly packed gravel serves to prevent sand and other formation fines from flowing into the wellbore during production.

Treatment fluids may also be used during stimulation operations. For example, hydrocarbon producing wells can be stimulated using fracturing treatments that may involve a fracturing fluid pumped through a wellbore and into a subterranean formation producing zone at a rate and pressure such that one or more fractures are formed or extended into the zone. Hydraulic fracturing treatments may produce primary fractures in the near field around the well bore, as well as induced, dendritic fractures (also known as "microfractures") in the far field extending from the primary fractures. These induced, dendritic fractures are generally formed at the tip and edges of the primary fractures, and extend outwardly in a branching tree like manner from the primary fractures, creating a complex fracture network. The complex fracture network encompasses the primary fracture and any and all branching fractures (e.g., secondary branch fractures, tertiary branch fractures, etc.), regardless of their size, man-made or otherwise, within a subterranean formation that are in fluid communication with the wellbore. Because secondary dendritic fractures can extend transversely to the trajectory of the primary fractures, they reach and link natural fractures both in and adjacent to the trajectory of the primary fractures. As such, secondary fractures reach a larger portion of the naturally occurring fracture network, and link the natural fractures back to the primary fractures and the wellbore. Accordingly, communication between the primary fracture and the remainder of the corresponding complex fracture network may be an important factor in maximizing production from the formation.

The fracturing treatment fluid may also function as a carrier fluid that transports solids to a target area. For example, particulate solids, also known as "proppant particulates," "proppants," or "particulates," may be suspended in a portion of the fracturing treatment fluid and transported to a fracture. The suspended particulates are deposited in the fractures so as to prevent the fractures from fully closing once the hydraulic pressure is removed. By keeping the fractures from fully closing, the proppant particulates aid in forming conductive channels through which produced hydrocarbons can readily flow. Accordingly, proppant particulates hold the complex fracture network open, thereby maintaining the ability for hydrocarbons to flow through the complex fracture network to ultimately be produced at the surface.

Another example of a treatment fluid may include fluids capable of diverting the flow of subsequent downhole fluids or treatment fluids. For example, in order to insure that a producing zone is uniformly contacted by a treatment fluid, a treatment fluid may be injected downhole which includes a chemical diverting agent capable of directing the placement of a desired treatment fluid. Such diverting fluids may, for instance, provide temporary isolation of newly stimulated portions of a formation during hydraulic fracturing operations. The temporary isolation of the desired portion of the wellbore or formation may be removed following the operation by natural degradation of the chemical diverting agent.

Accordingly, additional treatment fluids having one or more advantageous properties are desired.

BRIEF DESCRIPTION OF THE DRAWINGS

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

In the following discussion and in the claims, the terms "including" and "comprising" are used in an open-ended fashion, and thus should be interpreted to mean "including, but not limited to . . . ". Reference to up or down will be made for purposes of description with "upper," or "uphole" meaning toward the surface of the wellbore and with "lower," or "downhole" meaning toward the terminal end of the well, regardless of the wellbore orientation.

As used herein, the term "treatment fluid" refers to a fluid designed and prepared to produce or resolve a specific condition of a subterranean well or formation, such as for stimulation, isolation, gravel packing, or fluid diversion. The term "treatment fluid" does not necessarily imply any particular action by the fluid.

As used herein, the term "gravel" is used to refer to not only natural gravel but other proppant type materials, natural and man-made or synthetic, such as, for example, sand, pebbles, and synthetic beads. The term "gravel" is not used to refer to a particular particle size or shape but may be used to refer to any particle size or shape, or any particle size distribution or particle shape distribution, suited to forming a "gravel pack" or similar structure during wellbore operations.

As used herein, the term "fiber," as may be used in the term "degradable fiber," refers to a suitable fiber or particle having an aspect ratio greater than 1. The aspect ratio refers to the ratio of the longest axis to the shortest axis of the fiber or particle. The term "fiber" is meant to include, among others, suitable fibers and particles that may have, for example, a platelet shape or a string tinsel shape. The degradable fibers may have any suitable physical dimensions, shape, or morphology.

As used herein, the term "free" as used in "free cross-linking agent or compound," is meant to refer to an unbound cross-linking agent, compound, or component, rather than a cross-linking agent, compound, or component that is grafter or bound to a degradable fiber. The term "free cross-linking agent or compound" specifically excludes cross-linking agents or moieties that are bound or grafted to a degradable fiber.

The various characteristics described in more detail below, will be readily apparent to those skilled in the art with the aid of this disclosure upon reading the following detailed description, and by referring to the accompanying drawings.

The present disclosure is directed to treatment fluid compositions and methods of treating a subterranean wellbore or formation that include a hydratable and crosslinkable polymer and degradable fibers grafted with a crosslinking moiety. The use of treatment fluids having a crosslinker for the hydratable polymer grafted onto the degradable fibers enhances the performance of the treatment fluid in generating a stable network for transporting proppant during hydraulic fracturing, gravel packing, and frac-packing treatments. In particular, the presently disclosed treatment fluids containing degradable fibers grafted with a crosslinker enhances the elasticity of the treatment fluid, including polymer-based fracturing treatment fluids, thereby enhancing elasticity for static suspension of proppant or gravel, and imparting stability of the resultant network at high shear.

According to at least one aspect of the present disclosure, a treatment fluid is provided. The treatment fluid may include a carrier fluid, a crosslinkable polymer, and one or more degradable fibers grafted with a crosslinking moiety capable of crosslinking the crosslinkable polymer. The treatment fluid may in some instances further comprise a proppant suited for use in a hydraulic fracturing operation or a gravel suited for use in a gravel-packing operation. According to one aspect, the treatment fluid may be a hydraulic fracturing treatment fluid, a gravel packing treatment fluid, or a diverting treatment fluid.

According to another aspect of the present disclosure, a method of treating a subterranean formation is provided. The method may include providing a first treatment fluid. The first treatment fluid may include a carrier fluid, a crosslinkable polymer, and one or more degradable fibers grafted with a crosslinking moiety capable of crosslinking the crosslinkable polymer. The method may further include introducing the first treatment fluid into a subterranean formation. The method may further include forming a crosslinked polymer network by crosslinking the crosslinkable polymer. In such cases, the crosslinked polymer network includes degradable fibers and crosslinked polymer. The method may further include degrading the degradable fibers to produce a flow path in the crosslinked polymer network.

In at least some instances, the treatment fluid may be used in a hydraulic fracturing operation. In such cases, the first treatment fluid may be introduced into the subterranean formation at an injection rate sufficient to generate pressure above fracture pressure to form at least one fracture in the subterranean formation. The method may further include providing a second treatment fluid. The second treatment fluid may include a carrier fluid, a crosslinkable polymer, one or more degradable fibers grafted with a crosslinking moiety capable of crosslinking the crosslinkable polymer, and a proppant. The method may further include introducing the second treatment fluid into a subterranean formation. In such cases, the second treatment fluid may be introduced into the subterranean formation at an injection rate sufficient to place proppant into the at least one fracture. The method may further include forming a proppant pack by crosslinking the crosslinkable polymer. In such instances, the proppant pack may include proppant suspended in a crosslinked polymer network that includes degradable fibers and cross-linked polymer. The method may also include degrading the degradable fibers to produce a flow path in the proppant pack.

In at least some instances, the treatment fluid may be used in a gravel pack operation. In such cases, the first treatment fluid may further include gravel. The method may include providing a screen in a subterranean wellbore adjacent to the subterranean formation and introducing the first treatment fluid into an annulus between the screen and a wall of the subterranean wellbore. The method may also include forming a gravel pack by crosslinking the crosslinkable polymer. In such cases, the gravel pack includes gravel suspended in a crosslinked polymer network that includes degradable fibers and crosslinked polymer. The method may also include degrading the degradable fibers to produce a flow path in the gravel pack.

According to another aspect of the present disclosure, a system is provided. The system may include a blending tank that includes a treatment fluid. The treatment fluid includes a carrier fluid, a crosslinkable polymer, one or more degradable fibers grafted with a crosslinking moiety capable of crosslinking the crosslinkable polymer, and optionally, proppant or gravel. The system further includes a well head and a high pressure pump. The system may further include a tubular coupled to the high pressure pump and the blending tank. The tubular has an internal fluid path for introducing the treatment fluid through the well head and into a subterranean formation.

According to another aspect of the present disclosure, a method for preparing a treatment fluid for use in a subterranean wellbore is provided. The method includes grafting one or more crosslinking moieties directly onto one or more degradable fibers to form a grafted degradable fiber composition. The method further includes mixing the degradable fiber composition with a crosslinkable polymer capable of being crosslinked by the one or more crosslinking moieties and a carrier fluid. The grafting includes forming a covalent bond between the one or more crosslinking moieties and the one or more degradable fibers in the presence of a chemical base and/or alkaline conditions greater than pH 7.

Figure 1:
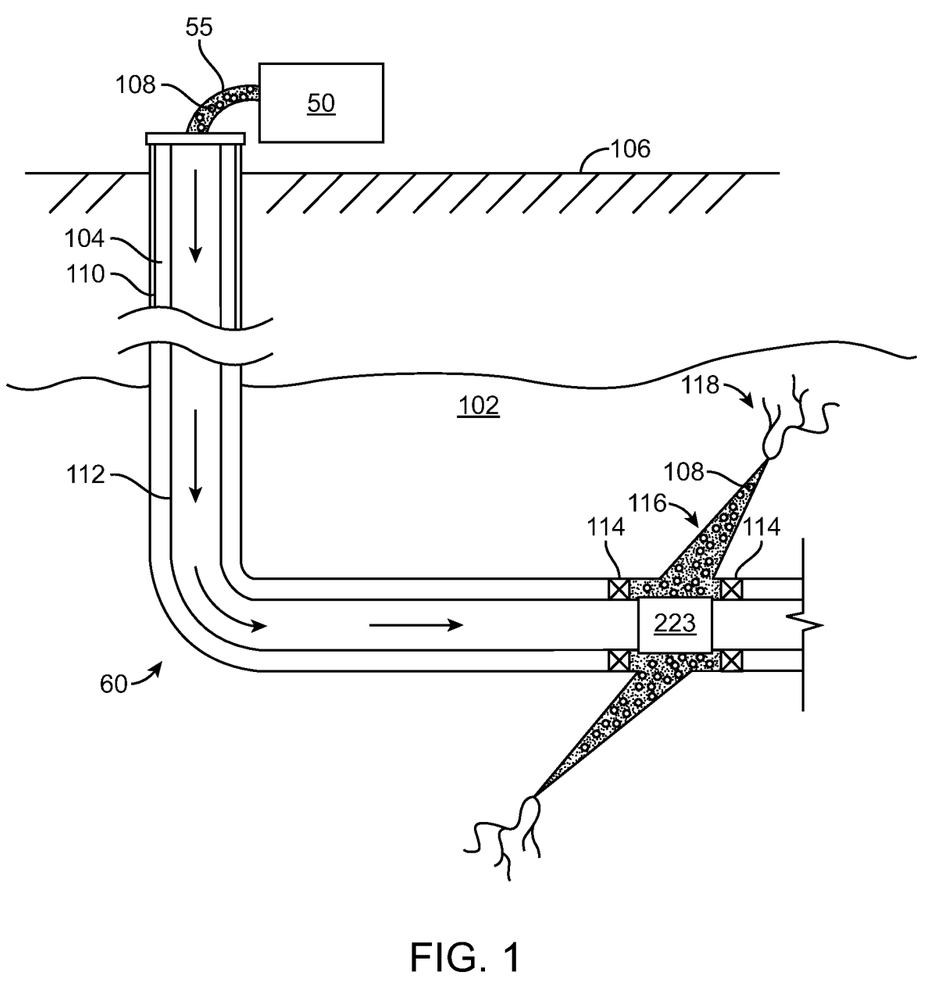
FIG. 1 is a schematic view of a wellbore operating environment in which a hydraulic fracturing treatment fluid may be deployed in accordance with certain exemplary embodiments of the present disclosure.

FIG. 1 illustrates a schematic view of an embodiment of a wellbore operating environment in which a treatment fluid may be deployed. As depicted, wellbore 104 of well 60 extends through various earth strata including a subterranean zone or formation of interest 102. FIG. 1 shows the well 60 during a fracture treatment of zone of interest 102. The subterranean zone 102 can include one or more subterranean formations or a portion of a subterranean formation.

The treatment fluid 108 may be applied to the subterranean zone 102 through wellbore 104 which extends from a terranean surface 106. Although the wellbore 104 in FIG. 1 is shown as vertical deviating to horizontal, the wellbore 104 may include horizontal, vertical, slant, curved, and other types of wellbore geometries and orientations without departing from the spirit and scope of this disclosure. Additionally, the treatment fluid may be applied to a subterranean zone surrounding any portion of the wellbore 104 without departing from the spirit and scope of this disclosure.

The wellbore 104 can include a casing 110 that is cemented or otherwise secured to the wellbore wall. However, the wellbore 104 can be uncased (e.g., open hole) or include uncased sections without departing from the spirit and scope of the present disclosure. Perforations can be formed in the casing 110 to allow treatment fluids and/or other materials to flow into the subterranean zone 102. In cased wells, perforations can be formed using shape charges, a perforating gun, hydrojetting and/or other tools.

The well 60 is depicted with a work string 112 depending from the terranean surface 106 into the wellbore 104. A pump and blender system 50 is coupled to the work string 112 by a tubular 55 to communicate treatment fluid 108 into the wellbore 104. The pump and blender system 50 resides at the terranean surface 106 at or near well 60. In some cases, the pump and blender system 50 combines a crosslinkable polymer, one or more degradable fibers grafted with a crosslinking moiety capable of crosslinking the crosslinkable polymer, and optionally a proppant source or gravel source, with a carrier fluid and possibly other components to form treatment fluid 108, as shown in more detail in FIG. 3, discussed below. The resulting treatment fluid 108 may be pumped down the well 60 under pressure to treat the subterranean zone 102. In at least some instances, treatment fluid 108 may be a hydraulic fracturing treatment fluid pumped down the well 60 under pressure to fracture stimulate subterranean zone 102, thereby enhancing production of hydrocarbons from the subterranean zone 102.

As depicted in FIG. 1, the work string 112 may include coiled tubing, jointed pipe, and/or other structures that communicate fluid through the wellbore 104. The work string 112 can include flow control devices 223 (e.g., bypass valves, ports, and/or other tools or well devices) that control a flow of fluid from the interior of the work string 112 into the subterranean zone 102. For example, the work string 112 may include ports adjacent the wellbore wall to communicate the fracturing fluid 108 directly into the subterranean zone 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 1 depicts two packers 114, one defining an uphole boundary of the interval and one defining the downhole end of the interval.

As depicted, the fracturing treatment of subterranean zone 102 produced both a primary fracture 116 in the near field as well as secondary, induced, dendritic fractures 118 in the far field (dendritic fractures 118 can also be referred to as "microfractures"). The secondary fractures 118 have propagated from or near the ends and edges of the primary fracture 116.

The fracturing treatment may be performed in one or more stages, where different amounts, sizes, and/or concentrations of proppant or, in some stages, no proppant is provided into the fractures 116, 118. For example, in certain instances, the fractures 116, 118 can be initiated with a fracturing fluid containing little or no proppant, then subsequent stages can provide the proppant to the fractures 116, 118 in a manner that fills and props open both the secondary fractures 118 and primary fractures 116. Given the small size of the dendritic, secondary fractures 118, one or more of the stages may introduce a micro-proppant such that the particle size is less than the transverse dimension of the fracture when held open under fracturing pressure. In some cases, the micro-proppant may be smaller than 100 mesh (149 µm), and in certain instances equal to or smaller than 200 mesh (74 µm), 230 mesh (63 µm) or even 325 mesh (44 µm), or smaller. The stages can be arranged to provide proppant such that the secondary fractures 118 are propped by the micro-proppant. The stages can also be arranged to provide the proppant and micro-proppant intermixed and/or some stages can provide substantially just micro-proppant and other stages can provide just larger proppant.

Figure 2:
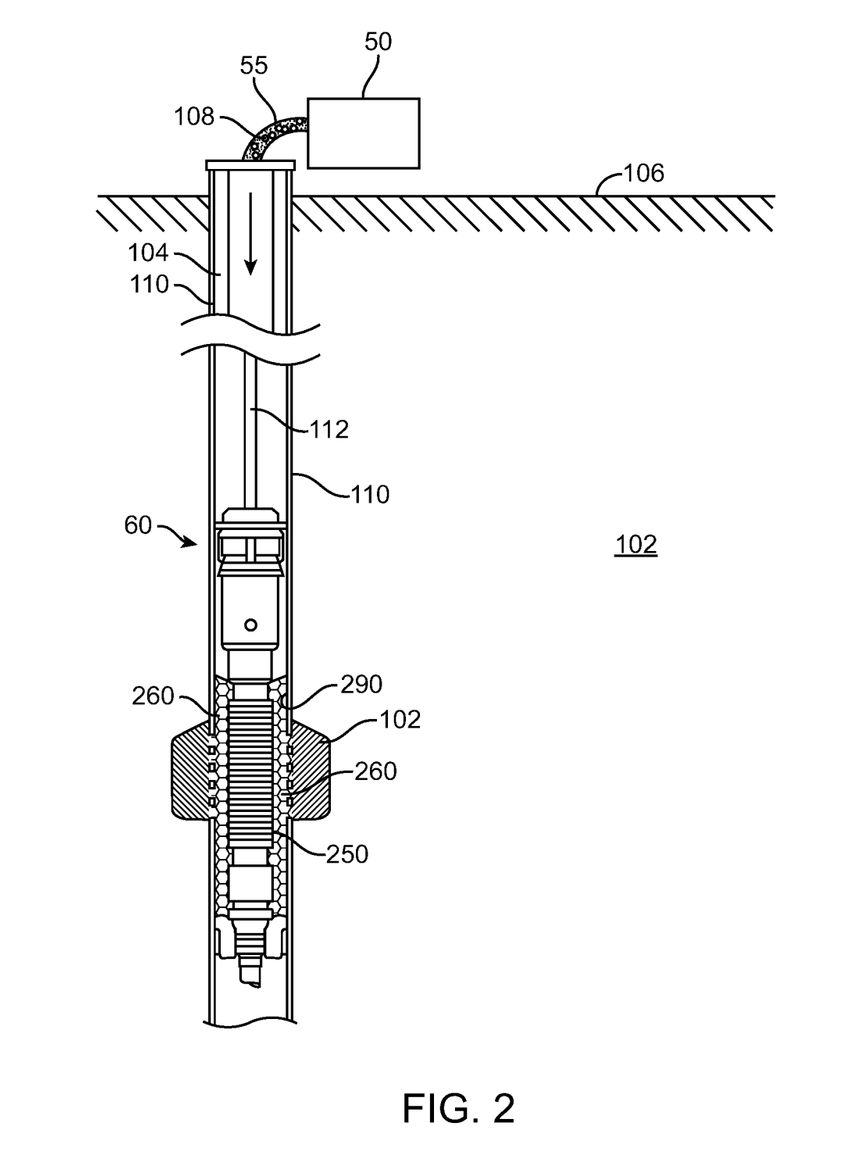
FIG. 2 is a schematic view of a wellbore operating environment in which a gravel packing treatment fluid may be deployed in accordance with certain exemplary embodiments of the present disclosure.

In addition to the hydraulic fracturing and diversion operations depicted in FIG. 1, the presently disclosed treatment fluids may also be employed in gravel packing operations as depicted in FIG. 2. As depicted in FIG. 2, wellbore 104 of well 60 extends through various earth strata including a subterranean zone or formation of interest 102. FIG. 2 shows the well 60 during a gravel-packing treatment of zone of interest 102. The subterranean zone 102 can include one or more subterranean formations or a portion of a subterranean formation.

The treatment fluid 108 may be applied to the subterranean zone 102 through wellbore 104 which extends from a terranean surface 106. Although the wellbore 104 in FIG. 2 is shown as vertical deviating to horizontal, the wellbore 104 may include horizontal, vertical, slant, curved, and other types of wellbore geometries and orientations without departing from the spirit and scope of this disclosure. Additionally, the treatment fluid may be applied to a subterranean zone surrounding any portion of the wellbore 104 without departing from the spirit and scope of this disclosure.

The wellbore 104 can include a casing 110 that is cemented or otherwise secured to the wellbore wall. However, the wellbore 104 can be uncased (e.g., open hole) or include uncased sections without departing from the spirit and scope of the present disclosure. Perforations can be formed in the casing 110 to allow treatment fluids and/or other materials to flow into the subterranean zone 102. In cased wells, perforations can be formed using shape charges, a perforating gun, hydrojetting and/or other tools.

The well 60 is depicted with a work string 112 depending from the terranean surface 106 into the wellbore 104. A pump and blender system 50 is coupled to the work string 112 by a tubular 55 to communicate treatment fluid 108 into the wellbore 104. The pump and blender system 50 resides at the terranean surface 106 at or near well 60. In some cases, the pump and blender system 50 combines a crosslinkable polymer, one or more degradable fibers grafted with a crosslinking moiety capable of crosslinking the crosslinkable polymer, and a gravel source, with a carrier fluid and possibly other components to form treatment fluid 108, as shown in more detail in FIG. 3, discussed below.

As depicted in FIG. 2, a screen 250 may be provided within well 60 adjacent to subterranean formation 112 and a wall 290 of the subterranean wellbore 104. The resulting treatment fluid 108 may be pumped down the well 60 under pressure to treat the subterranean zone 102. In at least some instances, treatment fluid 108 may be a gravel-packing treatment fluid pumped down the well 60 under pressure to introduce the gravel-packing treatment fluid into an annulus between the screen 250 and a wall 290 of the subterranean wellbore 104 to form a gravel pack 260. The gravel pack 260 is capable of filtering the formation sand or unwanted particles.

Figure 3:
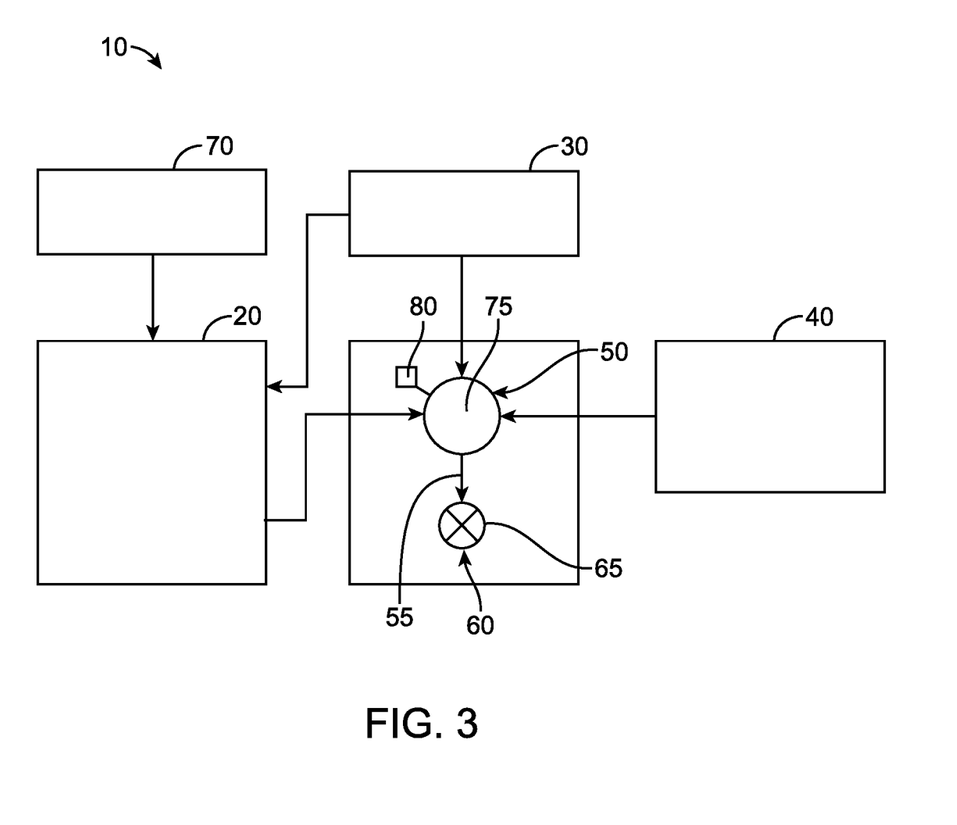
FIG. 3 is a diagram illustrating an example of a treatment fluid system that may be used in accordance with certain exemplary embodiments of the present disclosure.

FIG. 3 depicts a treatment fluid system for treating a subterranean formation that may be used in accordance with certain exemplary embodiments of the present disclosure. As depicted in FIG. 3, the system 10 includes a treatment fluid producing apparatus 20, a carrier fluid source 30, a proppant or gravel source 40, and a pump and blender system 50, residing at the surface at a well site where a well head 65 of well 60 is located (as shown in FIGS. 1 and 2). In certain instances, the treatment fluid producing apparatus 20 combines a carrier fluid (e.g., liquid or substantially liquid) from carrier fluid source 30, to produce a treatment fluid such as a hydraulic fracturing treatment fluid used to fracture a formation, a diverting treatment fluid, or a gravel packing treatment fluid. The treatment fluid can be a fluid for ready use in a wellbore operating environment, such as that depicted in FIG. 1 or FIG. 2, or a treatment fluid concentrate to which additional fluid is added prior to use in a wellbore. In other instances, the treatment fluid producing apparatus 20 can be omitted and the treatment fluid sourced directly from the carrier fluid source 30.

The proppant or gravel source 40 can include a proppant for combination with the carrier fluid to form, for instance, a hydraulic fracturing treatment fluid, or may include a gravel for combination with a carrier fluid to form, for instance, a gravel packing treatment fluid. The system may also include additive source 70 that serves as a source for the crosslinkable polymer and the grafted degradable fibers described herein. The additive source 70 may also serve as a source for one or more additives (e.g., gelling agents, weighting agents, or viscoelastic surfactants, or clay stabilizers and/or other optional additives) to alter the properties of the treatment fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives, at a blending tank 75, the treatment fluid from the treatment fluid producing apparatus 20 and combines it with other components, including, optionally, proppant or gravel from the proppant or gravel source 40 and/or additional fluid from the carrier fluid source 30 to form the treatment fluid, such as treatment fluid 108 described in FIG. 1 or FIG. 2. The resulting treatment fluid may be pumped into the well head 65 and down the well 60 through a tubular 55 coupled to the blending tank 75 and using a high pressure pump 80 coupled with the blending tank 75 and the tubular 55. In the case of the hydraulic fracturing operating environment depicted in FIG. 1, the treatment fluid is pumped into the well head 65 and down the well 60 at a pressure sufficient to create or enhance one or more fractures in a subterranean zone shown in FIG. 1, for example, to stimulate production of fluids from the zone. In other instances, the treatment fluid is pumped into the well head 65 and down the well 60 at pressure sufficient to introduce the treatment fluid into an annulus between the screen and a wall of the subterranean well bore 60, such as in the gravel packing operation depicted in FIG. 2. In yet other cases, the treatment fluid is pumped into to the well head 65 and down the well 60 at a pressure sufficient to treat the subterranean formation of interest.

Notably, in certain instances, the fracturing fluid producing apparatus 20, carrier fluid source 30, and/or proppant or gravel source 40 may be equipped with one or more metering devices (not shown) to control the flow of fluids, additives, proppants, and/or other compositions to the pumping and blender system 50. Such metering devices may permit the pumping and blender system 50 to be sourced from one, some or all of the different sources at a given time, and may facilitate the preparation of treatment fluids in accordance with the present disclosure using continuous mixing or "on-the-fly" methods. Thus, for example, the pumping and blender system 50 can provide just treatment fluid into the well at some times, just proppants at other times, and combinations of those components at yet other times.

According to the present disclosure, treatment fluid compositions that include a hydratable and crosslinkable polymer and degradable fibers grafted with a crosslinking moiety are provided. Fibers are useful, for example, in polymer-based hydraulic fracturing fluids as they provide additional network for proppant suspension. The presently disclosed grafted degradable fibers are capable of acting as a crosslinker to yield a crosslinked network in addition to providing additional network for proppant suspension. The crosslinked sites provided by the presently disclosed grafted degradable fibers forms a strong stable network structure with fiber stands crisscrossing and adhering to each other, thereby trapping and suspending any proppant, gravel, or particulates within the three-dimensional fiber/polymer network. By grafting a crosslinking moiety directly onto the fibers, the resultant crosslinked network, formed by the crosslinking of a hydratable polymer by the crosslinking moiety, has been found to have advantageous properties such as enhanced stability at high shear and enhanced elasticity for static suspension of proppant or gravel. Additionally, degradation of the grafted degradable fibers disclosed herein also generates acid which in turn greatly enhances the breakdown of the crosslinked polymer, thereby reducing or eliminating the need for including a breaker in the treatment fluid.

The degradable fibers may be any suitable degradable fiber capable of providing additional network for proppant suspension and of degrading in the subterranean environment. In at least some instances, the degradable fibers may be unsubstituted lactide, glycoside, polylactide acid, polyglycolic acid, copolymers of polylactic acid and polyglycolic acid, copolymers of glycolic acid and hydroxyl-, carboxylic acid-, or hydroxycarboxylic acid-containing moieties, copolymers of lactic acid and hydroxyl-, carboxylic acid-, or hydroxycarboxylic acid-containing moieties, or any combination thereof.

The presently disclosed treatment fluids include degradable fibers grafted with one or more crosslinking moieties. The crosslinking moiety may be any crosslinking moiety capable of crosslinking a suitable crosslinkable polymer. In at least some instances, the crosslinking moiety may include borate, aluminum, titanium, and zirconium. In some instances, aluminum or borate crosslinking moieties may be grafted onto a degradable polymer, such as polylactic acid (PLA), according to:

able fiber by a covalent bond. In at least some instances, the crosslinking moiety may be grafted to one or more degradable fibers at a pH greater than 7. In at least some instances, the presently disclosed treatment fluids may include degradable fibers having more than one crosslinkable moieties grafted to a single degradable fiber.

According to at least one aspect of the present disclosure, a method for preparing a treatment fluid for use in a subterranean wellbore is provided that includes grafting one or more crosslinking moieties directly onto one or more degradable fibers. In at least some instances, the grafting may include forming a covalent bond between the one or more crosslinking moieties and the one or more degradable fibers in the presence of a chemical base and alkaline conditions greater than pH 7. The method may further include mixing the degradable fiber composition with a crosslinkable polymer capable of being crosslinked by the one or more crosslinking moieties and a carrier fluid.

The presently disclosed treatment fluid compositions may include degradable fibers that are not grafted with a crosslinking moiety, e.g. non-grafted degradable fibers, in addition to the degradable fibers grafted with a crosslinking moiety. The presently disclosed treatment fluid compositions may include any ratio of grafted degradable fibers to non-grafted degradable fibers. For instance, the presently disclosed treatment fluid compositions may have a ratio of grafted degradable fibers to non-grafted degradable fibers of greater than 100 to 1, or 75 to 1, or 50 to 1, or 35 to 1, or 25 to 1, or 20 to 1, or 15 to 1, or 10 to 1, or 5 to 1, or 2 to 1, or 1 to 1. In other instances the treatment fluid compositions may comprise greater than about 5 weight % (wt %) grafted degradable fibers, or greater than about 10 wt % grafted degradable fibers, or greater than about 15 wt % grafted degradable fibers, or greater than about 20 wt %

As shown above, the crosslinking moiety may be grafted onto a degradable fiber in the presence of chemical base, such as sodium hydroxide (NaOH). However, the crosslinking moiety may be grafted onto the degradable polymer in any manner resulting in the crosslinking moiety being coupled to the degradable polymer and the grafted degradable fiber and the crosslinking moiety being able to crosslink a crosslinkable polymer. In at least some instances, the crosslinking moiety is grafted to the degradable fiber such that a covalent bond is formed between the crosslinking moiety and the degradable fiber. In at least some instances, one or more crosslinking moieties are coupled to a degradgrafted degradable fibers, or greater than about 25 wt % grafted degradable fibers, or greater than about 35 wt % grafted degradable fibers, or greater than about 50 wt % grafted degradable fibers, or greater than about 65 wt % grafted degradable fibers, or greater than about 75 wt % grafted degradable fibers, or greater than about 85 wt % grafted degradable fibers or greater than about 90 wt % grafted degradable fibers, or greater than about 95 wt % grafted degradable fibers, as calculated by weight percent (wt %) relative to the total weight of degradable fibers in the treatment fluid composition.

The degradable fibers may have an aspect ratio greater than one. In some instances, degradable fibers having an aspect ratio greater than 100 may be preferred. In at least some instances, the degradable fibers may have an average (number average) diameter of from about 2 microns to about 200 microns. The degradable fibers may have any shape or morphology including platelet-shaped or string tinsel-shaped. Additionally, the degradable fibers may have a straight, crimped, curved, spiral-shaped, or other desired three-dimensional geometry.

The presently disclosed treatment fluid compositions include a crosslinkable polymer. The crosslinkable polymer may be any crosslinkable polymer capable of forming a three-dimensional polymer network. In at least some instances, the crosslinkable polymer may include guar, hydroxypropyl guar, carboxymethylhydroxypropyl guar, carboxymethyl guar, diutan, xanthan, scleroglucan, hydroxyethylcellulose, or any combination thereof. In at least some instances, the crosslinkable polymer may be any polymer capable of being crosslinked by the crosslinking moiety grafted on the degradable fibers of the presently disclosed compositions. In at least some instances, the crosslinkable polymer is a hydratable polymer and/or a water-based polymer. For instance, the crosslinkable polymer may be crosslinked by the grafted degradable fiber according to:

The presently disclosed treatment fluids also include a carrier fluid, that may be any fluid suitable for downhole operations. In at least some instances, the carrier fluid may be water or an aqueous solution. In at least some instances, the carrier fluid may be selected from the group consisting of seawater, produced water, flowback water, fresh water, saltwater, and any combination thereof. In at least some instances, the carrier fluid does not contain a crosslinker moiety or a crosslinker component. In such cases, substantially all of the crosslinker moiety present in the treatment fluid composition is grafted to a degradable fiber. In other instances, the majority of the crosslinker moiety in the treatment fluid composition is grafted to a degradable fiber. In yet other instances, the presently disclosed treatment fluid compositions do not include a crosslinker component other than the grafted degradable fibers. In some instances, the presently disclosed treatment fluid compositions contain no free cross-linker component or moiety and/or no added free cross-linker component or moiety.

In some instances, the presently disclosed treatment fluids may optionally include a proppant, gravel, or other particulants. For example, the treatment fluid may in some instances further comprise a proppant suited for use in a hydraulic fracturing operation or a gravel suited for use in a gravel-packing operation. According to one aspect of the present disclosure, the treatment fluid may be a hydraulic fracturing treatment fluid, a gravel packing treatment fluid, or a diverting treatment fluid.

In at least some instances, a treatment fluid is provided that includes borate crosslinker grafted onto degradable polylactic acid (PLA) polymer fibers. The grafted PLA polymer fibers are capable of crosslinking a guar-based treatment fluid. The grafted PLA polymer fibers are degradable in the wellbore environment and can assist with the breaking of the guar-based treatment fluid as the PLA hydrolyzes to lactic acid.

The presently disclosed treatment fluids that include the combination of grafted degradable fibers and hydratable polymers crosslinkable by the grafted crosslinking moiety provide crosslinked networks with enhanced stability and strength, as well as enhanced elasticity for static proppant or gravel suspension, and enhanced stability at high shear. The enhanced properties of the presently disclosed grafted degradable fiber treatment fluids generally reduces the amount and/or concentration of polymer and crosslinker needed to produce proppant packs, gravel packs, or diverting agents, as compared to conventional techniques. The use of the grafted degradable fiber treatment fluids disclosed herein, further reduces the potential of polymer gel damage as compared to conventional treatment fluids containing crosslinkable gels. After chemically reacting with the hydratable polymers to form a crosslinked network, the grafted degradable fibers are capable of degrading or dissolving with time in the subterranean wellbore or formation environment to be completely removed from the crosslinked network, such as from a proppant pack or a gravel pack.

In at least some instances, the presently disclosed grafted degradable fiber treatment fluids are capable of reducing or limiting the usage of breakers since the grafted degradable fibers may be capable of degrading or hydrolyzing to produce acid capable of breaking down crosslinked networks or gels.

The presently disclosed treatment fluids may be used to provide transport of injected materials, including, but not limited to, proppants, particulates, and gravel. Additionally, the presently disclosed treatment fluids may be used in fluid loss control or friction reduction.

Figure 4:
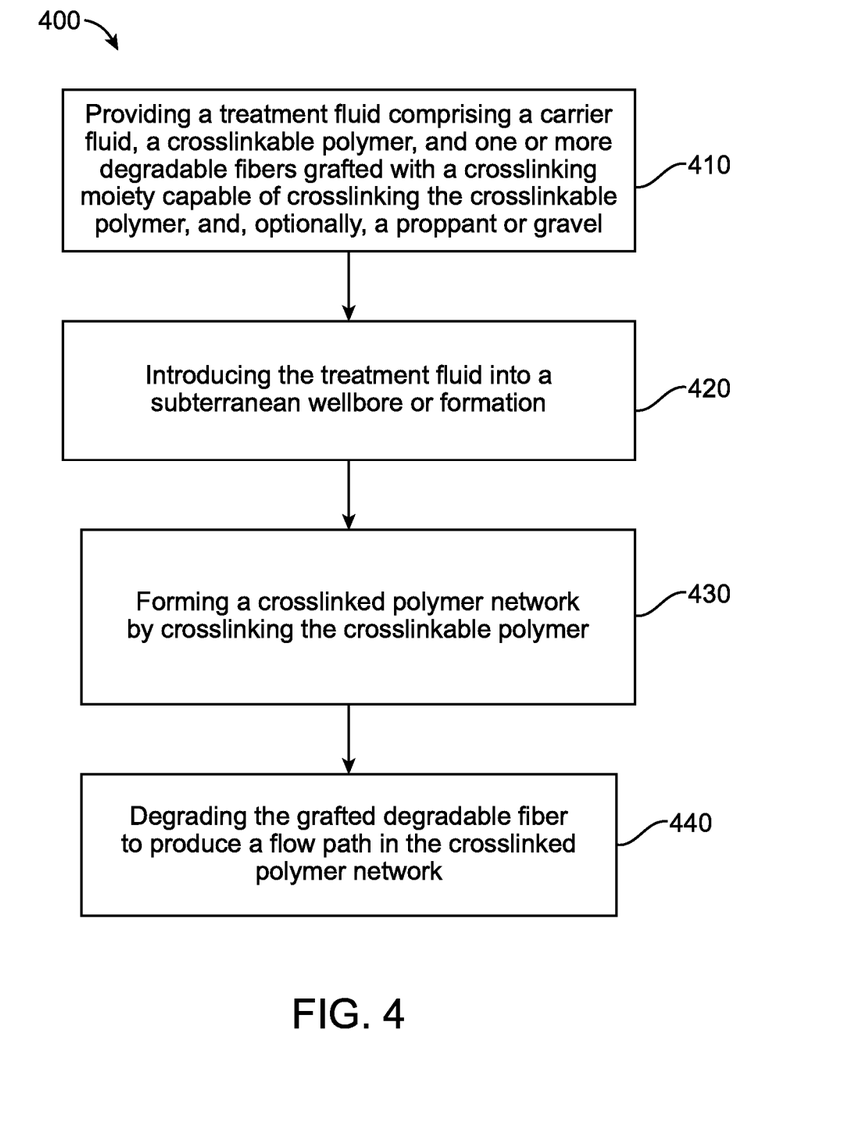
FIG. 4 is a flowchart describing a method of treating a subterranean wellbore or formation that includes introducing a treatment fluid containing degradable fibers grafted with a crosslinking moiety, according to an exemplary embodiment of the present disclosure.

The present disclosure further provides methods of treating a subterranean wellbore or formation using the presently disclosed treatment fluids. Referring to FIG. 4, a flowchart is presented in accordance with an example embodiment of the present disclosure. The example method shown in FIG. 4 is provided by way of an example, as there are a variety of ways to carry out the method. Each block shown in FIG. 4 represents one or more processes or methods carried out in the example method shown in FIG. 4. Furthermore, the illustrated order of blocks is illustrative only and the order of the blocks can change according to the present disclosure. Additional blocks can be added or fewer blocks can be utilized, without departing from this disclosure.

Method 400 depicted in FIG. 4 is an example method, according to an example embodiment of the present disclosure. The method 400 depicted in FIG. 4 is just an example method and can be adopted to various operating environments, such as those depicted in FIG. 1 or FIG. 2, by adding or removing one or more blocks. The example method 400 can begin at block 410. At block 410, a first treatment fluid is provided. The first treatment fluid may comprise degradable fibers grafted with a crosslinking moiety, a hydratable and crosslinking polymer, and a carrier fluid. The first treatment fluid may also optionally include a proppant or gravel. The crosslinking moiety may be capable of crosslinking the crosslinkable polymer. At block 420, the method 400 further includes introducing the first treatment fluid into a subterranean wellbore or formation. The method 400 may further include, at block 430, forming a crosslinked polymer network in the subterranean wellbore or formation by crosslinking the crosslinkable polymer. The forming of a crosslinked polymer network may occur, for example, by chemical reaction between the crosslinking moiety grafted on the degradable fibers and the crosslinkable polymer, as described above. The chemical reaction forming the crosslinked polymer network may occur after a period of time following introduction of the treatment fluid into the subterranean wellbore or formation, without further intervention by an operator. At block 440, the method may further include degrading the grafted degradable fibers in the crosslinked polymer network to produce a flow path in the crosslinked polymer network. The degrading of the grafted degradable fibers may occur after a period of time following formation of the crosslinked polymer network, without further intervention by an operator. For example, the grafted degradable fibers may degrade after a period of time under the chemical and physical conditions of the wellbore. In other cases, the grafted degradable fibers may be degraded by introducing a second treatment fluid into the subterranean wellbore or formation. In such cases, the second treatment fluid may cause the grafted degradable fibers to degrade in order to produce a flow path in the crosslinked polymer network. In at least some instances, the flow path constitutes permeability sufficient to allow formation fluids to permeate the crosslinked polymer network. In some cases, the flow path has sufficient permeability to allow formation fluids to permeate the crosslinked polymer network and enter the wellbore or production tubing in order to be produced.

Figure 5:
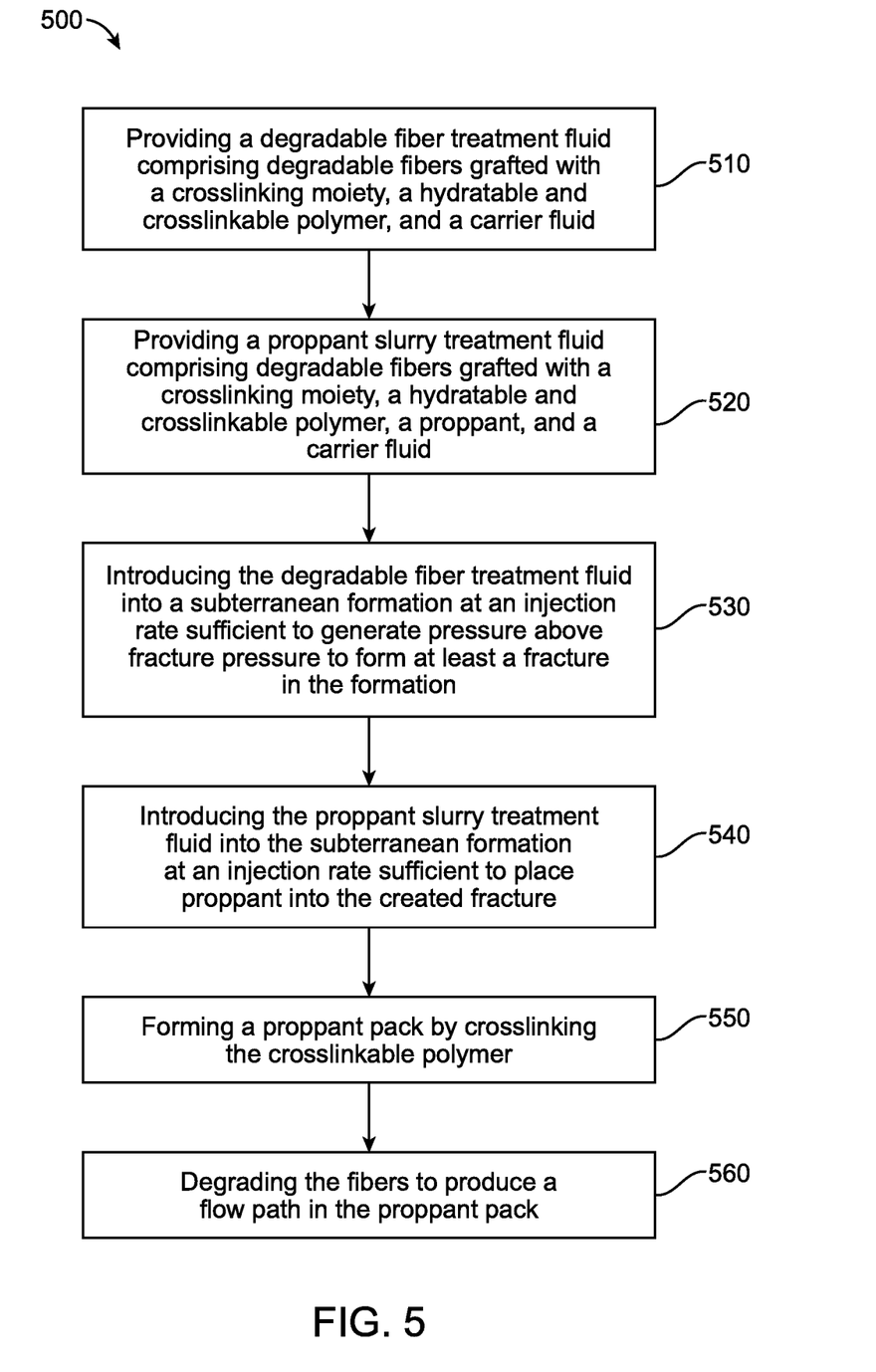
FIG. 5 is a flowchart describing a method of treating a subterranean formation that includes introducing a proppant slurry treatment fluid containing degradable fibers grafted with a crosslinking moiety, according to an exemplary embodiment of the present disclosure.

Referring to FIG. 5, a flowchart is presented in accordance with an example embodiment of the present disclosure. The example method shown in FIG. 5 is provided by way of an example, as there are a variety of ways to carry out the method. Each block shown in FIG. 5 represents one or more processes or methods carried out in the example method shown in FIG. 5. Furthermore, the illustrated order of blocks is illustrative only and the order of the blocks can change according to the present disclosure. Additional blocks can be added or fewer blocks can be utilized, without departing from this disclosure.

Method 500 depicted in FIG. 5 is an example method that may be used in a hydraulic fracturing operation, such as that depicted in FIG. 1, according to an example embodiment of the present disclosure. The method 500 depicted in FIG. 5 is just an example method and can be adopted to other operating environments by adding or removing one or more blocks. The example method 500 can begin at block 510. At block 510, a first treatment fluid is provided. The first treatment fluid may be, for example, a degradable fiber treatment fluid comprising degradable fibers grafted with a crosslinking moiety, a hydratable and crosslinking polymer, and a carrier fluid. The crosslinking moiety may be capable of crosslinking the crosslinkable polymer. At block 520, the method 500 further includes providing a second treatment fluid. The second treatment fluid may be, for example, a proppant slurry treatment fluid comprising degradable fibers grafted with a crosslinking moiety, a hydratable and crosslinkable polymer, a proppant, and a carrier fluid. At block 530, the method 500 may further include introducing the first treatment fluid, e.g., the degradable fiber treatment fluid, into a subterranean formation at an injection rate sufficient to generate pressure above fracture pressure to form at least a fracture in the formation. At block 540, the method 500 further includes introducing the second treatment fluid, e.g., the proppant slurry treatment fluid into the subterranean formation at an injection rate sufficient to place proppant into the created fracture.

Method 500 further includes, at block 550, forming a proppant pack in the subterranean formation by crosslinking the crosslinkable polymer. The forming of a proppant pack may occur, for example, by chemical reaction between the crosslinking moiety grafted on the degradable fibers and the crosslinkable polymer, as described above. The chemical reaction forming the proppant pack may occur after a period of time following introduction of the treatment fluid into the subterranean wellbore or formation, without further intervention by an operator. At block 560, method 500 further includes degrading the degradable fibers to produce a flow path in the proppant pack. The degrading of the grafted degradable fibers may occur after a period of time following formation of the proppant pack, without further intervention by an operator. For example, the grafted degradable fibers may degrade after a period of time under the chemical and physical conditions of the wellbore. In other cases, the grafted degradable fibers may be degraded by introducing a third treatment fluid into the subterranean wellbore or formation. In such cases, the third treatment fluid may cause the grafted degradable fibers to degrade in order to produce a flow path in the proppant pack. In at least some instances, the flow path constitutes permeability sufficient to allow formation fluids to permeate the proppant pack and enter the wellbore or production tubing in order to be produced.

Figure 6:
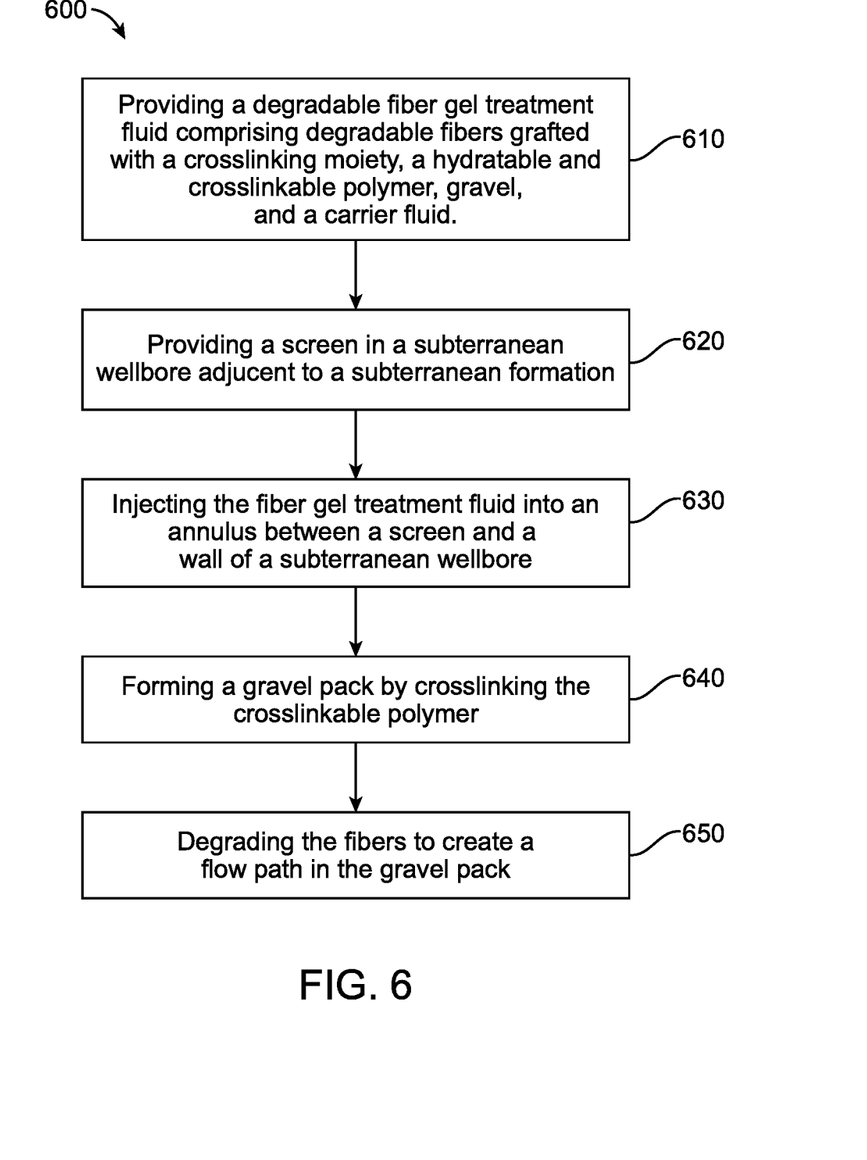
FIG. 6 is a flowchart describing a method of treating a subterranean formation or wellbore that includes injecting a fiber gel treatment fluid containing degradable fibers grafted with a crosslinking moiety in order to form a gravel pack, according to an exemplary embodiment of the present disclosure.

Referring to FIG. 6, a flowchart is presented in accordance with an example embodiment of the present disclosure. The example method shown in FIG. 6 is provided by way of an example, as there are a variety of ways to carry out the method. Each block shown in FIG. 6 represents one or more processes or methods carried out in the example method shown in FIG. 6. Furthermore, the illustrated order of blocks is illustrative only and the order of the blocks can change according to the present disclosure. Additional blocks can be added or fewer blocks can be utilized, without departing from this disclosure.

Method 600 depicted in FIG. 6 is an example method that may be used in a gravel packing operation, such as that depicted in FIG. 2, according to an example embodiment of the present disclosure. The method 600 depicted in FIG. 6 is just an example method and can be adopted to other operating environments by adding or removing one or more blocks. The example method 600 can begin at block 610. At block 610, a first treatment fluid is provided. The first treatment fluid may be, for example, a degradable fiber gel treatment fluid comprising degradable fibers grafted with a crosslinking moiety, a hydratable and crosslinking polymer, a gravel, and a carrier fluid. The crosslinking moiety may be capable of crosslinking the crosslinkable polymer. At block 620, the method 600 further includes providing a screen in a subterranean wellbore adjacent to a subterranean formation. The screen may be, at least in some instances, a sand screen. The screen may be provided, for example, adjacent to wall of the subterranean wellbore, thus forming an annulus between the screen and a wall of the wellbore. At block 630, the method 600 may further include introducing the first treatment fluid, e.g., the degradable fiber gel treatment fluid, into an annulus between the screen and a wall of a subterranean wellbore. At block 640, the method 600 further includes forming a gravel pack in the subterranean wellbore by crosslinking the crosslinkable polymer. The gravel pack may, for instance, be formed in the annulus between the screen and the wall of the subterranean wellbore. The forming of the gravel pack may occur, for example, by chemical reaction between the crosslinking moiety grafted on the degradable fibers and the crosslinkable polymer, as described above. The chemical reaction forming the gravel pack may occur after a period of time following introduction of the treatment fluid into the subterranean wellbore or formation, without further intervention by an operator. At block 650, method 600 further includes degrading the degradable fibers to produce a flow path in the gravel pack. The degrading of the grafted degradable fibers may occur after a period of time following formation of the gravel pack, without further intervention by an operator. For example, the grafted degradable fibers may degrade after a period of time under the chemical and physical conditions of the wellbore. In other cases, the grafted degradable fibers may be degraded by introducing a second treatment fluid into the subterranean wellbore or formation. In such cases, the second treatment fluid may cause the grafted degradable fibers to degrade in order to produce a flow path in the gravel pack. In at least some instances, the flow path constitutes permeability sufficient to allow formation fluids to enter the wellbore or production tubing in order to be produced.

In order to facilitate a better understanding of the present disclosure, the following examples of certain aspects of some embodiments are provided. In no way should the following examples be read to limit, or define, the entire scope of the present disclosure.

EXAMPLES

Example 1—Preparation and Testing of Borate-Grafted PLA Degradable Fibers 0.5 grams of PLA degradable fibers (~6K MW) were placed in a 250-mL container. Approximately 10 mL of water was added to the PLA degradable fibers followed by the addition of sodium hydroxide (NaOH) to bring the mixture to approximately pH 11.5. The mixture was mixed thoroughly for 1 minute at room temperature. 0.3 mL of 0.5M sodium borate was added to the mixture. The mixture was mixed at room temperature for 5 minutes and then placed in an oven at 200° F. for 2 hours to allow for water evaporation. The borate-grafted PLA degradable fibers were allowed to cool to room temperature. The borate-grafted PLA degradable fibers were mixed with 20 mL hydroxypropyl guar (HPG) resulting in cross-linked HPG.

Example 2—Preparation of Conventional Treatment Fluid Containing Proppant Suspended in Crosslinked HPG Fluids 200 mL of tap water and 0.04 gallons per thousand gallons (gpt) of ascetic acid were added to a 250 mL Waring blender. 30 pounds per thousand gallons (lb/Mgal) of HPG was added and the mixture was allowed to sit for 30 minutes in order to allow the polymers to hydrate. NaOH was added to the hydrated HPG mixture in order to bring the pH of the mixture to the range of from about pH 11.2 to about 11.5. 0.45 mL of 0.5M sodium borate was added to the mixture (2.25 gpt) and the mixture was stirred to allow the treatment fluid composition to crosslink. 72 grams of 20/40 Saint Gobain ISP proppant was added to the crosslinked fluid. The mixture was mixed vigorously to produce a homogeneous mixture with proppant fully suspended in the crosslinked fluid.

Example 3—Preparation of Grafted Degradable Fibers Treatment Fluid Containing Proppant Suspended in Crosslinked HPG 200 mL of tap water and 0.04 gallons per thousand gallons (gpt) of ascetic acid were added to a 250 mL Waring blender. 20 pounds per thousand gallons (lb/Mgal) of HPG was added and the mixture was allowed to sit for 30 minutes in order to allow the polymers to hydrate. NaOH was added to the hydrated HPG mixture in order to bring the pH of the mixture to the range of from about pH 11.2 to about 11.5. Using an overhead mixer placed on top of the borate grafted PLA degradable fibers prepared according to Example 1, the 200 mL of 20 lb/Mgal HPG was added directly to a container containing the grafted PLA degradable fibers. The mixture was mixed with the overhead mixer at high speed (approximately 1500 rpm) allowing the fluid to crosslink. To this crosslinked fluid, 72 grams of 20/40 Saint Gobain ISP proppant was added. The mixture was mixed vigorously to produce a homogeneous mixture with proppant fully suspended in the crosslinked fluid.

The proppant treatment fluids prepared in Example 2 and Example 3 were each transferred to a 100-mL graduated cylinder and observed over time at room temperature. After 5 hours, the grafted degradable fiber treatment fluid prepared according to Example 3, having a lower polymer loading of 20 lb/Mgal, had similar proppant suspension polymers as the conventional 30 lb/Mgal polymer loading treatment fluid prepared according to Example 2. Additionally, the grafted degradable fiber treatment fluid of Example 3 exhibited less soluble residue than the conventional treatment fluid of Example 2, thus the grafted degradable fiber treatment fluid yielded better proppant pack conductivity.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that a system including either one member of the set, or multiple members of the set, or all members of the set, satisfies the claim.

Statements of the Disclosure Include:

Statement 1: A treatment fluid comprising: a carrier fluid; a crosslinkable polymer; and one or more degradable fibers grafted with a crosslinking moiety capable of crosslinking the crosslinkable polymer.

Statement 2: A treatment fluid according to Statement 1, further comprising a proppant.

Statement 3: A treatment fluid according to Statement 1, further comprising a gravel suited for use in a gravel-packing operation.

Statement 4: A treatment fluid according to any one of the preceding Statements 1-3, wherein the crosslinking moiety is selected from the group consisting of borate, aluminum, titanium, and zirconium.

Statement 5: A treatment fluid according to any one of the preceding Statements 1-4, wherein the degradable fibers are selected from the group consisting of substituted and unsubstituted lactide, glycoside, polylactide acid, polyglycolic acid, copolymers of polylactic acid and polyglycolic acid, copolymers of glycolic acid and hydroxyl-, carboxylic acid-, or hydroxycarboxylic acid-containing moieties, copolymers of lactic acid and hydroxyl-, carboxylic acid-, or hydroxycarboxylic acid-containing moieties, and any combination thereof.

Statement 6: A treatment fluid according to any one of the preceding Statements 1-5, wherein the crosslinkable polymer is selected from the group consisting of guar, hydroxypropyl guar, carboxymethylhydroxypropyl guar, carboxymethyl guar, diutan, xanthan, scleroglucan, hydroxyethylcellulose, and any combination thereof.

Statement 7: A treatment fluid according to any one of the preceding Statements 1-6, wherein the crosslinking moiety is grafted to one or more degradable fibers in the presence of a chemical base.

Statement 8: A treatment fluid according to any one of the preceding Statements 1-7, wherein the crosslinking moiety is grafted to one or more degradable fibers at a pH greater than 7.

Statement 9: A treatment fluid according to any one of the preceding Statements 1-8, wherein the crosslinking moiety is coupled to one or more degradable fibers by a covalent bond.

Statement 10: A treatment fluid according to any one of the preceding Statements 1-8, wherein the crosslinking moiety is covalently bound to one or more degradable fibers.

Statement 11: A treatment fluid according to any one of the preceding Statements 1-10, wherein the crosslinkable polymer is a hydratable polymer.

Statement 12: A treatment fluid according to any one of the preceding Statements 1-11, wherein the crosslinkable polymer is a water-based polymer.

Statement 13: A treatment fluid according to any one of the preceding Statements 1-12, wherein the treatment fluid is one of a hydraulic fracturing treatment fluid, a gravel packing treatment fluid, and a diverting treatment fluid.

Statement 14: A treatment fluid according to any one of the preceding Statements 1-13, wherein the treatment fluid contains no added cross-linker.

Statement 15: A treatment fluid according to any one of the preceding Statements 1-13, wherein the treatment fluid substantially contains no free cross-linking agent or compound.

Statement 16: A method of treating a subterranean wellbore or formation, the method comprising: providing a first treatment fluid comprising: a carrier fluid; a crosslinkable polymer; and one or more degradable fibers grafted with a crosslinking moiety capable of crosslinking the crosslinkable polymer; and introducing the first treatment fluid into a subterranean wellbore or formation.

Statement 17: A method of treating a subterranean wellbore or formation according to Statement 16, further comprising: providing a second treatment fluid comprising: a carrier fluid; a crosslinkable polymer; one or more degradable fibers grafted with a crosslinking moiety capable of crosslinking the crosslinkable polymer; and a proppant; and introducing the second treatment fluid into a subterranean formation.

Statement 18: A method of treating a subterranean wellbore or formation according to Statement 16 or Statement 17, further comprising forming a crosslinked polymer network by crosslinking the crosslinkable polymer, the crosslinked polymer network comprising degradable fibers and crosslinked polymer.

Statement 19: A method of treating a subterranean wellbore or formation according to any one of the preceding Statements 16-18, further comprising degrading the degradable fibers to produce a flow path in the crosslinked polymer network.

Statement 20: A method of treating a subterranean wellbore or formation according to any one of the preceding Statements 16-19, wherein the crosslinking moiety is selected from the group consisting of borate, aluminum, titanium, and zirconium.

Statement 21: A method of treating a subterranean wellbore or formation according to any one of the preceding Statements 16-20, wherein the degradable fibers are selected from the group consisting of substituted and unsubstituted lactide, glycoside, polylactide acid, polyglycolic acid, copolymers of polylactic acid and polyglycolic acid, copolymers of glycolic acid and hydroxyl-, carboxylic acid-, or hydroxycarboxylic acid-containing moieties, copolymers of lactic acid and hydroxyl-, carboxylic acid-, or hydroxycarboxylic acid-containing moieties, and any combination thereof.

Statement 22: A method of treating a subterranean wellbore or formation according to any one of the preceding Statements 16-21, wherein the crosslinkable polymer is selected from the group consisting of guar, hydroxypropyl guar, carboxymethylhydroxypropyl guar, carboxymethyl guar, diutan, xanthan, scleroglucan, hydroxyethylcellulose, and any combination thereof.

Statement 23: A method of treating a subterranean wellbore or formation according to any one of the preceding Statements 16-22, wherein the crosslinking moiety is grafted to one or more degradable fibers in the presence of a chemical base.

Statement 24: A method of treating a subterranean wellbore or formation according to any one of the preceding Statements 16-23, wherein the crosslinking moiety is grafted to one or more degradable fibers at a pH greater than 7.

Statement 25: A method of treating a subterranean wellbore or formation according to any one of the preceding Statements 16-24, wherein the crosslinking moiety is coupled to one or more degradable fibers by a covalent bond.

Statement 26: A method of treating a subterranean wellbore or formation according to any one of the preceding Statements 16-24, wherein the crosslinking moiety is covalently bound to one or more degradable fibers.

Statement 27: A method of treating a subterranean wellbore or formation according to any one of the preceding Statements 16-26, wherein the crosslinkable polymer is a hydratable polymer.

Statement 28: A method of treating a subterranean wellbore or formation according to any one of the preceding Statements 16-27, wherein the crosslinkable polymer is a water-based polymer.

Statement 29: A method of treating a subterranean wellbore or formation according to any one of the preceding Statements 16-28, wherein the treatment fluid is one of a hydraulic fracturing treatment fluid, a gravel packing treatment fluid, and a diverting treatment fluid.

Statement 30: A method of treating a subterranean wellbore or formation according to any one of the preceding Statements 16-29, wherein the treatment fluid contains no added cross-linker.

Statement 31: A method of treating a subterranean wellbore or formation according to any one of the preceding Statements 16-30, wherein the treatment fluid substantially contains no free cross-linking agent or compound.

Statement 32: A method of treating a subterranean wellbore or formation according to any one of the preceding Statements 16-31, wherein the first treatment fluid is introduced into the subterranean formation at an injection rate sufficient to generate pressure above fracture pressure to form at least one fracture in the subterranean formation.

Statement 33: A method of treating a subterranean wellbore or formation according to any one of the preceding Statements 17-32, wherein the second treatment fluid is introduced into the subterranean formation at an injection rate sufficient to place proppant into the at least one fracture.

Statement 34: A method of treating a subterranean wellbore or formation according to Statement 33, further comprising forming a proppant pack by crosslinking the crosslinkable polymer, the proppant pack comprising proppant suspended in a crosslinked polymer network comprising degradable fibers and crosslinked polymer.

Statement 35: A method of treating a subterranean wellbore or formation according to Statement 34, further comprising degrading the degradable fibers to produce a flow path in the proppant pack.

Statement 36: A method of treating a subterranean wellbore or formation according to any one of the preceding Statements 16-32, wherein the first treatment fluid further comprises gravel.

Statement 37: A method of treating a subterranean wellbore or formation according to Statement 36, further comprising providing a screen in a subterranean wellbore adjacent to the subterranean formation, wherein the first treatment fluid is introduced into an annulus between the screen and a wall of the subterranean wellbore.

Statement 38: A method of treating a subterranean wellbore or formation according to Statement 37, further comprising forming a gravel pack by crosslinking the crosslinkable polymer, the gravel pack comprising gravel suspended in a crosslinked polymer network comprising degradable fibers and crosslinked polymer.

Statement 39: A method of treating a subterranean wellbore or formation according to Statement 38, further comprising degrading the degradable fibers to produce a flow path in the gravel pack.

Statement 40: A system for treating a subterranean formation, the system comprising: a blending tank comprising a treatment fluid according to any one of the preceding Statements 1-15; and a well head; a high pressure pump; and a tubular coupled to the high pressure pump and blending tank, the tubular having an internal fluid path for introducing the treatment fluid through the well head and into a subterranean formation.

Statement 41: A method for preparing a treatment fluid for use in a subterranean wellbore, the method comprising: grafting one or more crosslinking moieties directly onto one or more degradable fibers to form a grafted degradable fiber composition; mixing the degradable fiber composition with a crosslinkable polymer capable of being crosslinked by the one or more crosslinking moieties and a carrier fluid.

Statement 42: A method for preparing a treatment fluid for use in a subterranean wellbore according to Statement 41, wherein in the grafting comprises forming a covalent bond between the one or more crosslinking moieties and the one or more degradable fibers in the presence of a chemical base and alkaline conditions greater than pH 7.

Statement 43: A method for preparing a treatment fluid for use in a subterranean wellbore according to Statement 41 or Statement 42, wherein the treatment fluid has a composition according to any one of the preceding Statements 1-15.

We claim:

1. A treatment fluid comprising:
    a carrier fluid;
    a crosslinkable polymer; and
    one or more degradable fibers grafted with a crosslinking moiety capable of crosslinking the crosslinkable polymer.

2. The treatment fluid according to claim 1, further comprising a proppant.

3. The treatment fluid according to claim 1, further comprising a gravel suited for use in a gravel-packing operation.

4. The treatment fluid according to claim 1, wherein the crosslinking moiety is selected from the group consisting of borate, aluminum, titanium, and zirconium.

5. The treatment fluid according to claim 1, wherein the degradable fibers are selected from the group consisting of substituted and unsubstituted lactide, glycoside, polylactide acid, polyglycolic acid, copolymers of polylactic acid and polyglycolic acid, copolymers of glycolic acid and hydroxyl-, carboxylic acid-, or hydroxycarboxylic acid-containing moieties, copolymers of lactic acid and hydroxyl-, carboxylic acid-, or hydroxycarboxylic acid-containing moieties, and any combination thereof.

6. The treatment fluid according to claim 1, wherein the crosslinkable polymer is selected from the group consisting of guar, hydroxypropyl guar, carboxymethylhydroxypropyl guar, carboxymethyl guar, diutan, xanthan, scleroglucan, hydroxyethylcellulose, and any combination thereof.

7. The treatment fluid according to claim 1, wherein the crosslinking moiety is covalently bound to one or more degradable fibers.

8. The treatment fluid according to claim 1, wherein the treatment fluid is one of a fracturing treatment fluid, a gravel packing treatment fluid, and a diverting treatment fluid.

9. The treatment fluid according to claim 1, where the treatment fluid contains no free cross-linking agent or compound.

10. A method of treating a subterranean formation, the method comprising:
    providing a first treatment fluid comprising:
        a carrier fluid;
        a crosslinkable polymer; and
        one or more degradable fibers grafted with a crosslinking moiety capable of crosslinking the crosslinkable polymer; and
    introducing the first treatment fluid into a subterranean wellbore or formation.

11. The method according to claim 10, further comprising forming a crosslinked polymer network by crosslinking the crosslinkable polymer, the crosslinked polymer network comprising degradable fibers and crosslinked polymer.

12. The method according to claim 10, further comprising degrading the degradable fibers to produce a flow path in the crosslinked polymer network.

13. The method according to claim 10, further comprising:
    providing a second treatment fluid comprising:
        a carrier fluid;
        a crosslinkable polymer;
        one or more degradable fibers grafted with a crosslinking moiety capable of crosslinking the crosslinkable polymer; and
        a proppant; and
    introducing the second treatment fluid into a subterranean formation.

14. The method according to claim 13, wherein the first treatment fluid is introduced into the subterranean formation at an injection rate sufficient to generate pressure above fracture pressure to form at least one fracture in the subterranean formation and wherein the second treatment fluid is introduced into the subterranean formation at an injection rate sufficient to place proppant into the at least one fracture.

15. The method according to claim 14, further comprising forming a proppant pack by crosslinking the crosslinkable polymer, the proppant pack comprising proppant suspended in a crosslinked polymer network comprising degradable fibers and crosslinked polymer.

16. The method according to claim 15, further comprising degrading the degradable fibers to produce a flow path in the proppant pack.

17. The method according to claim 10, wherein the first treatment fluid further comprises gravel.

18. The method according to claim 17, further comprising:
- providing a screen in a subterranean wellbore adjacent to the subterranean formation, wherein the first treatment fluid is introduced into an annulus between the screen and a wall of the subterranean wellbore; and
- forming a gravel pack by crosslinking the crosslinkable polymer, the gravel pack comprising gravel suspended in a crosslinked polymer network comprising degradable fibers and crosslinked polymer.

19. The method according to claim 18, further comprising degrading the degradable fibers to produce a flow path in the gravel pack.

20. A system for treating a subterranean formation, the system comprising:
- a blending tank comprising a treatment fluid, the treatment fluid comprising:
  - a carrier fluid;
  - a crosslinkable polymer;
  - one or more degradable fibers grafted with a crosslinking moiety capable of crosslinking the crosslinkable polymer; and
  - proppant or gravel; and
- a well head;
- a high pressure pump; and
- a tubular coupled to the high pressure pump and blending tank, the tubular having an internal fluid path for introducing the treatment fluid through the well head and into a subterranean formation.

\* \* \* \* \*